Patented Apr. 14, 1936

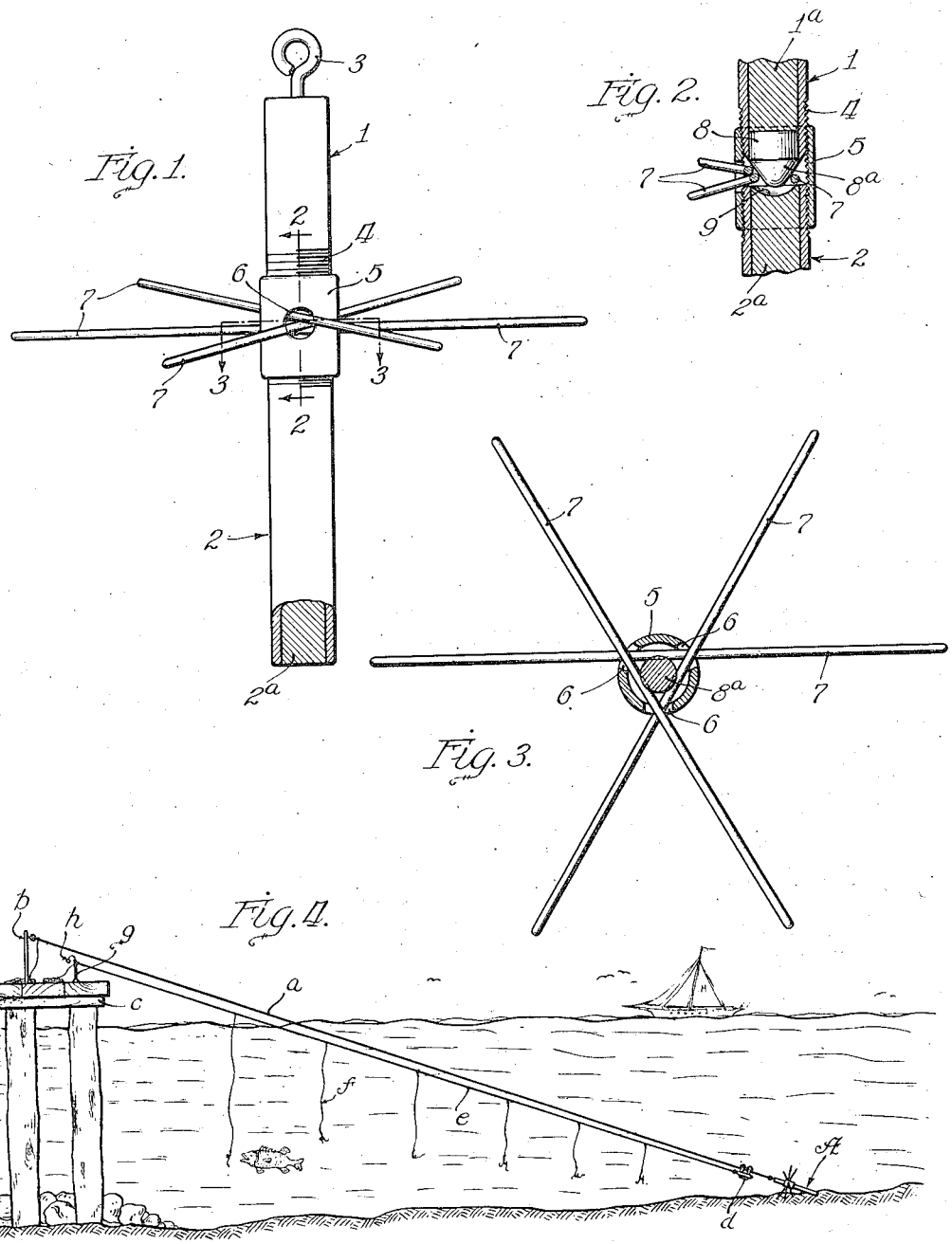

2,037,232

UNITED STATES PATENT OFFICE 2,037,232

TROLLEY ANCHOR

Arthur W. Hendriks, Chicago, Ill., assignor to Arthur H. Boettcher, Evanston, Ill.

Application April 22, 1935, Serial No. 17,576

5 Claims. (Cl. 43—52)

This invention has to do with anchoring devices, and relates to a trolley anchor for use in what is known as trolley fishing.

My invention is directed, in general, to the provision of a trolley anchor of simple and inexpensive construction, which is efficient in use and, when disassembled, occupies little space and is well suited for carrying in a fishing kit. More particularly, an object of my invention is to provide a trolley anchor having associated anchoring rods which, in the assembled condition of the anchor, project substantially radially from the body of the anchor, in conjunction with simple and efficient means for securing the rods in position while permitting ready removal thereof when desired. Further objects and advantages of my invention will appear from the detailed description.

In the drawing:—

Figure 1 is a side view, partly broken away and in section, of a trolley anchor embodying my invention, in assembled condition;

Figure 2 is a fragmentary sectional view taken substantially on line 2—2 of Figure 1;

Figure 3 is a section taken substantially on line 3—3 of Figure 1;

Figure 4 is an elevational view showing the manner of using the anchor of my invention;

The anchor of my invention comprises upper and lower sections 1 and 2, respectively, shown as of tubular construction. The upper section 1 is provided with a filling or core 1a of lead or other suitable material, lower section 2 being provided with a similar filling 2a. The object of the metal fillings or cores is to impart desired weight to the anchor. It will be understood, however, that the sections may be otherwise formed as, for instance, from suitable lengths of solid bar stock or, if desired, the sections may be hollow without any filling. A suitable eye 3 is secured in the upper end of section 1 of the body, and the lower end portion of this latter section is exteriorly threaded at 4 and screws into an interiorly threaded coupling element 5 secured upon the upper end of section 2. The coupling element 5 is illustrated as screwed upon the upper end of section 2, but it may be secured to this latter section in any suitable manner as, for example, by being formed integrally therewith. It will be understood, therefore, that coupling element 5 may be permanently secured to body section 2, section 1 being detached, either partially or completely, as required. The two sections of the body are thus connected by a screw coupling effective for forcing the two sections toward each other under considerable pressure.

The coupling element 5 is provided with a plurality of circumferentially spaced openings 6 of a size to receive anchor rods 7 inserted therethrough and disposed in overlying relation one to the other. The portions of the rods within coupling element 5 define a triangle, as shown in Figure 3. This triangle receives conical point 8a of an element 8 secured in the lower or inner end of body section 1, it being noted that the upper end of core 2a of lower section 2 of the body is recessed at 9 to accommodate the lower terminal portion of point 8a.

The openings 6 in coupling element 5 are shown, by way of example, as of circular shape, though it will be understood that these openings may be of any desired suitable form. In assembling the anchor, body section 1 is screwed out of coupling element 5 a proper distance to permit of ready insertion of rods 7 through openings 6. The rods are then inserted through these openings so as to be disposed as shown in Figure 3, after which section 1 is screwed into coupling element 5 so as to bring conical point 8a of element 8 into contact with the portions of the rods disposed within the coupling element 5, the body sections being then forced toward each other by screwing them together. This brings point 8a into contact with the rods in such manner as to exert considerable pressure thereon both radially of the body and lengthwise thereof. In this manner, the rods are effectively clamped between the body sections in such manner as to resist endwise displacement of the rods even when the latter are subjected to considerable endwise pressure. In this connection, the pressure exerted by point 8a of element 8 on the rods lengthwise of the body tends to bow the rods, which is highly efficient in resisting tendency of the rods to move lengthwise when subjected to lengthwise pressure. When the anchor is not to be used, the rods 7 can readily be released by turning section 1 of the housing a proper distance out of coupling element 5, thus releasing the rods, which may then be withdrawn lengthwise through the openings 6. The withdrawn rods may be placed with the body of the anchor, parallel therewith, so that the anchor, in disassembled condition, is well adapted for carrying in a fishing kit and occupies relatively small space therein, being then free of any objectionable projection such as would tend to catch in or become entangled with other articles in the kit.

In using the anchor, after it has been assembled in the above manner, a line $a$, known as a trolley line, is secured through eye 3 and the anchor is then thrown into the water where it sinks to the bottom, into which the rods 7 engage so as to hold the anchor in position. If the lake or other body of water which it is desired to fish has a rocky bottom, the anchor rods 7 are intended to engage with rocks or other obstructions so as to hold the anchor 1 in position. After the anchor has been properly located in the manner above, trolley line $a$ is suitably secured, at its upper end, to an upright $b$ which may be suitably secured to a support such as a wharf $c$, or the upright may be in the form of a pole secured in the shore in a suitable manner. The trolley line $a$ is maintained under appropriate tension and receives a wheeled trolley $d$ of known type which is weighted and travels upon the line. A fishing line $e$ is attached to the trolley $d$ and carries leaders or short lengths of line $f$ which carry the baited hooks. The upper portion of line $e$ may be secured in a suitable manner, and is commonly secured to a resilient upright $g$, secured in a suitable manner to support $c$, this upright carrying a small signal bell $h$. In Figure 4 the anchor, in its entirety, is designated A. The manner of using the anchor, above briefly described, is well known and needs no further description. The trolley $d$ and the signal bell and the support therefor are also well known and further description thereof is unnecessary.

What I claim is:—

1. In combination in a trolley anchor, a body comprising two sections disposed in endwise alignment, one of said sections being interiorly threaded at one end and the other section having threaded engagement therewith, providing a screw connection for releasably securing said sections together and forcing them toward each other, rods extending into said body between the ends of said sections and projecting beyond said body substantially radially thereof, and means supplemental to said connection for subjecting the portions of said rods within said body to transverse pressure substantially radially of said body and thereby clamping said rods to said body.

2. In combination in a trolley anchor, a body comprising two sections disposed in endwise alignment, one of said sections being interiorly threaded at one end and the other section having threaded engagement therewith, providing a screw connection for releasably securing said sections together and forcing them toward each other, rods extending into said body between the ends of said sections and projecting beyond said body substantially radially thereof, and means supplemental to said connection and comprising a tapered element disposed to subject the portions of said rods within said body to transverse pressure substantially radially of said body and thereby clamping said rods to said body.

3. In combination in a trolley anchor, a body comprising two sections disposed in endwise alignment, one of said sections being provided with an interiorly threaded coupling element and the other section having threaded engagement therewith, said element being provided with circumferentially spaced openings, anchor rods inserted through said openings and projecting beyond said body substantially radially thereof, and a conical element at the inner end of said other section and disposed to subject said rods to transverse pressure substantially radially of said body effective for clamping said rods thereto.

4. In combination in a trolley anchor, a body comprising two sections disposed in endwise alignment, one of said sections being provided with an interiorly threaded coupling element and the other section having threaded engagement therewith, said element being provided with circumferentially spaced openings, anchor rods inserted through said openings and projecting beyond said body substantially radially thereof, said rods being straight and disposed in overlying relation one to another, and a conical element carried by said other section and disposed to extend between and in contact with the portions of said rods within said coupling element.

5. In combination, in a trolley anchor, a body comprising two opposed sections, one having a terminal element provided with openings and rods inserted through said openings and projecting from said body substantially radially thereof, the other section having an element disposed for securing said rods when said sections are secured together in clamping relation one to the other, said terminal element and said other section having cooperating means for releasably securing said body sections together in rod clamping relation, said element of said other section and the adjacent portion of said one section opposed thereto being so related as to provide therebetween a space unobstructed to permit positioning of said rods relative to said body, when said body sections are out of clamping relation one to the other while remaining assembled together.

ARTHUR W. HENDRIKS.